Aug. 7, 1956  F. M. DELANY  2,757,949
PUSH-DOOR CONTROL SYSTEM FOR VEHICLES
Filed July 14, 1954  3 Sheets-Sheet 1
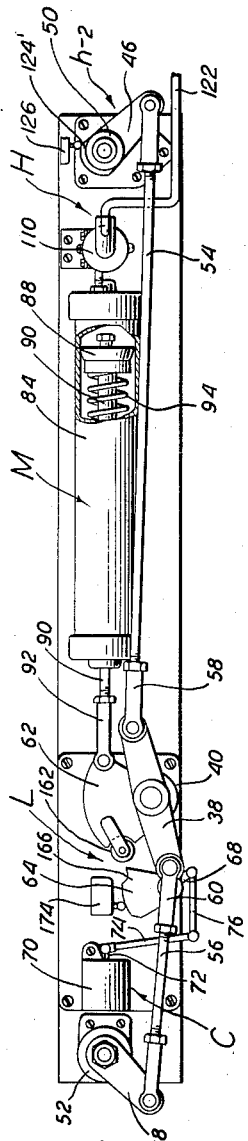
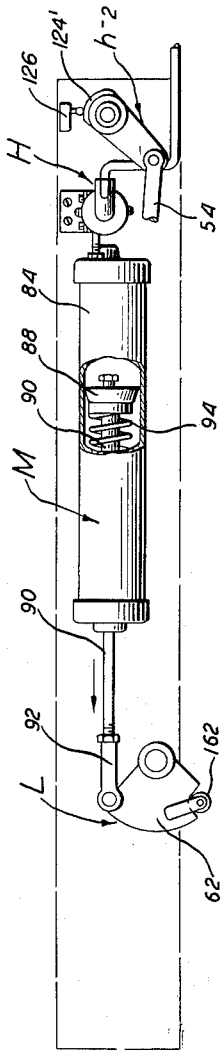
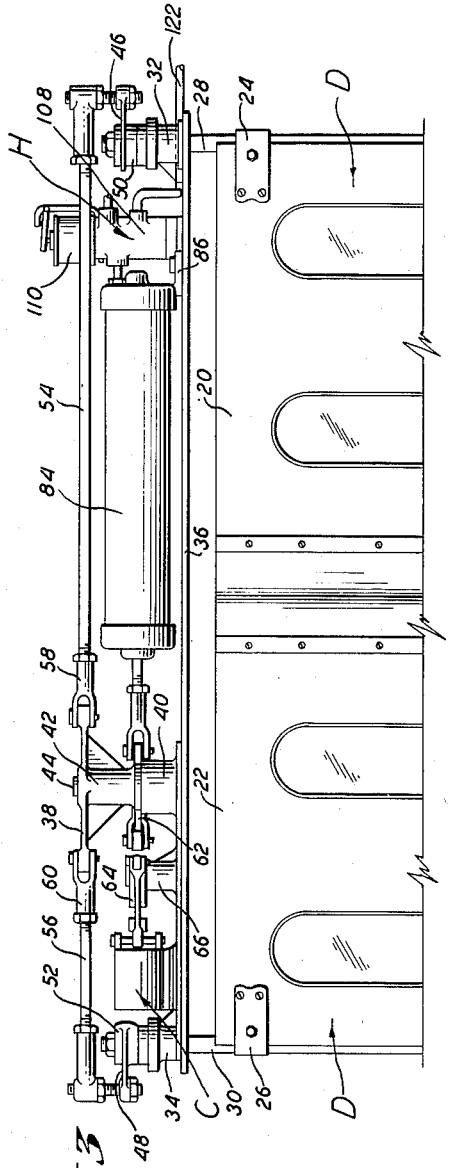
INVENTOR.
Frank M. Delany.
BY James Franklin
Attorney

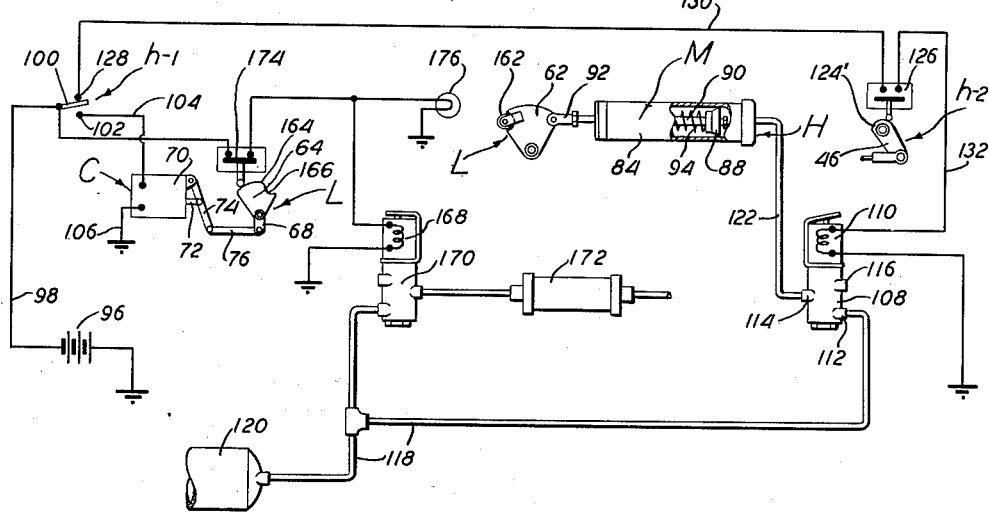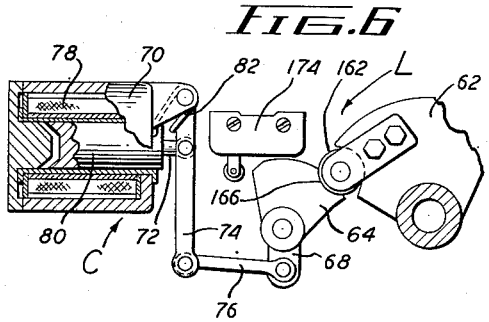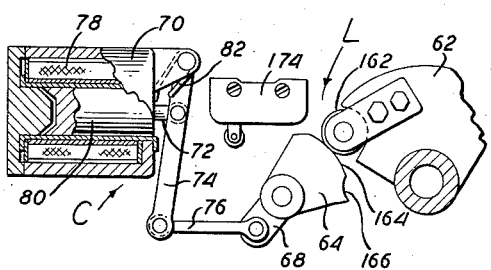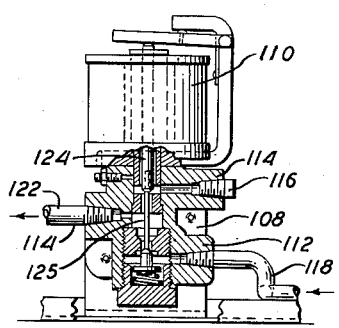

Aug. 7, 1956          F. M. DELANY          2,757,949
PUSH-DOOR CONTROL SYSTEM FOR VEHICLES
Filed July 14, 1954          3 Sheets-Sheet 3
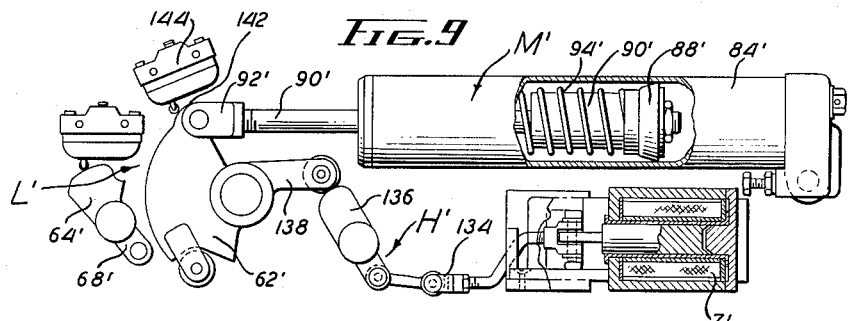
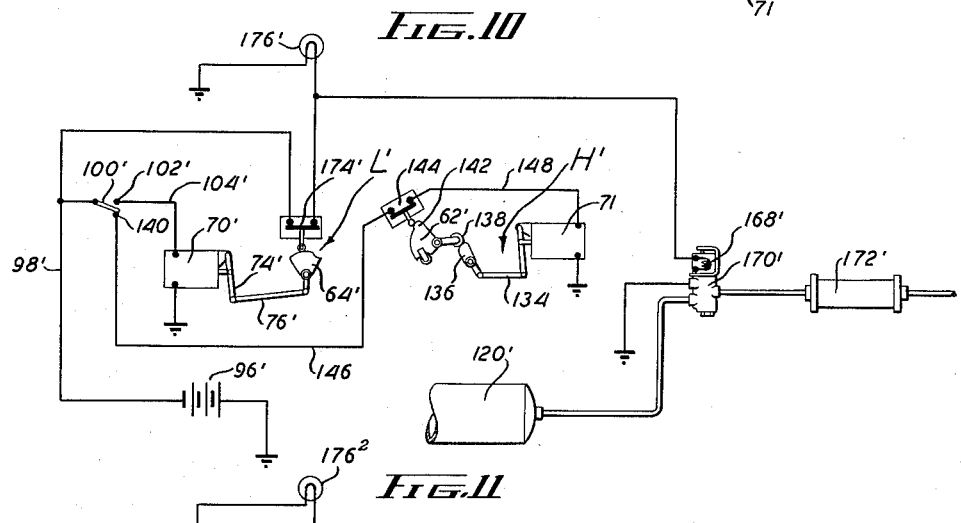
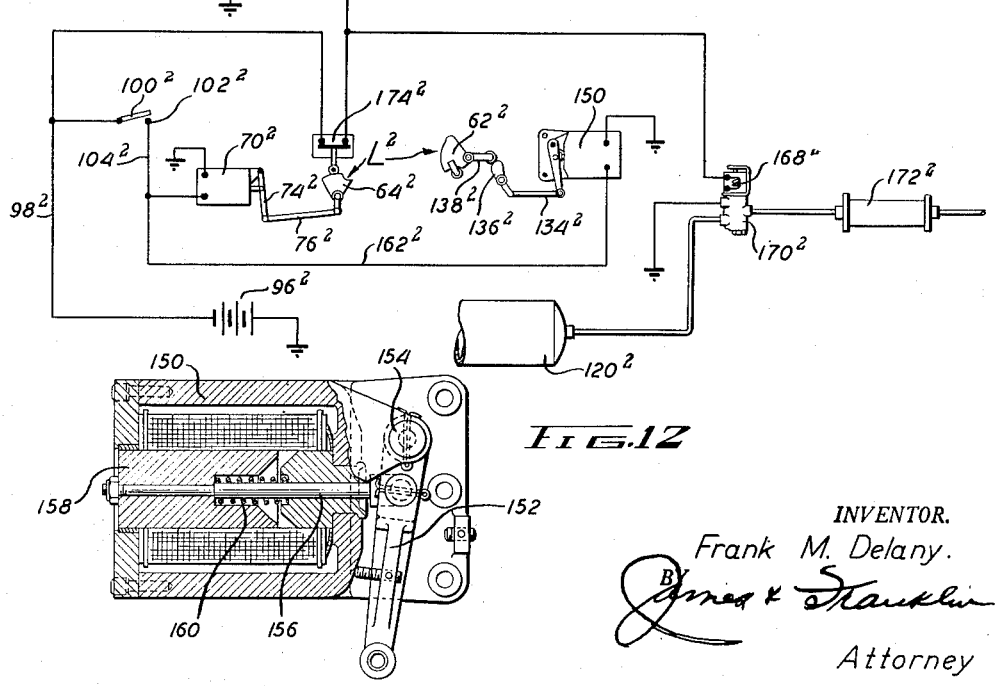
INVENTOR.
Frank M. Delany.
Attorney

United States Patent Office 2,757,949
Patented Aug. 7, 1956

2,757,949

PUSH-DOOR CONTROL SYSTEM FOR VEHICLES

Frank M. Delany, Summit, N. J., assignor to National Pneumatic Co., Inc., Boston, Mass., a corporation of Delaware Application July 14, 1954, Serial No. 443,293

12 Claims. (Cl. 292—1)

This invention relates to a door-control system for vehicles of the type which is operable by the joint action of the vehicle operator and a passenger, and relates more particularly to improvements in a push-door control system of this type.

As in the U. S. patents to John R. Newkirk, No. 2,259,579, of October 21, 1941, and No. 2,419,964, of May 6, 1947, and to Oliver W. Wood, No. 2,598,958, of June 3, 1952, the system of the present invention is for use on so-called one-man operated vehicles such as motor-buses, street cars, and the like, on which boarding and alighting facilities are provided which include a so-called side-door (or rear-door) exit remotely positioned with respect to the vehicle operator. The side-door (or rear-door) operating mechanism of this system is of the type by which, when the door, normally locked, is unlocked or unlatched by the vehicle operator, the door, remaining closed but unlatched, may be pushed open by a passenger desiring to leave the vehicle.

In the system of said patents, the act of pushing the door open energizes or loads a spring return motor which returns the door to closed position after the alighting passenger steps from the vehicle and releases the door. Mechanism is also provided, under the control of the vehicle operator for relatching and thereby relocking the door after it is returned to closed position by the spring return motor.

The principal object of my present invention centres about the provision of an improved system of this referred to type embodying mechanism for automatically holding the door open once it is pushed open by a passenger, such holding mechanism being under the releasing control of the vehicle operator. In the operation of this improved system, a door holding mechanism is provided which is rendered effective for its holding action by the conjoint action of the operator (as by operating a switch) and a passenger (by pushing the door open) the door being held open after the passenger alights and steps from the vehicle, until the vehicle operator effects the release of the holding mechanism. By such release the door is then returned to closed position by the spring return motor (and relatched or relocked by the operator).

By dint of this improved system the following advantages and functions are achieved: (a) instead of passengers being obliged to push the door all the way open after it has been unlocked by the vehicle operator, it will be merely necessary in a preferred embodiment to partly push the door after which the door will be automatically opened fully; (b) an advance passenger will need but push the door open without being required to hold the door open during his passage therethrough; (c) succeeding passengers of a group alighting at the same station or destination are relieved of the need of individually pushing or holding the door open; and (d) an ambling or slow moving passenger need not suffer the inconvenience of the door prematurely closing in his trail.

The system of said patents has further been improved (in said Patents Nos. 2,419,964 and 2,598,958) so that the door is prevented from being inadvertently opened (and thereby creating the possibility of an accident), should a person be leaning against the door when it is unlocked by an act of the vehicle operator, the door, however, being free to be pushed open if, at the time it is unlocked, there is no pressure on the door such as is incident to a passenger leaning against the door. The system of my present invention also incorporates this stated improvement.

To the accomplishment of the foregoing objects and such other objects as may hereinafter appear my invention relates to the push-door control system for vehicles as sought to be defined in the appended claims and described in the following specification taken together with the accompanying drawings, in which:

Fig. 1 is a top plan view of the door control system of the invention showing one embodiment thereof, and depicting the locking means of the door unlatched but the remainder of the door control mechanism in door closed condition;

Fig. 2 is a view similar to Fig. 1 but only of parts of the door control system and depicting the door control mechanism in door opened condition;

Fig. 3 is a vertical elevational view showing the upper portions of related swing doors, together with the door control system therefor, and depicting the parts in the same condition as depicted in Fig. 1;

Fig. 4 is a diagrammatic layout of the major mechanical components of the system together with electrical and pneumatic connections used therewith;

Figs. 5, 6 and 7 are views on an enlarged scale of a portion of the door locking means and control therefor, showing in sequence successive positions assumed by the parts in certain operations thereof;

Fig. 8 is a view on an enlarged scale, with parts shown in sections, of an electromagnetically operated valve mechanism used in the system of Figs. 1 to 4;

Fig. 9 is a top plan view of a modified embodiment of the door control system of the invention, depicting the parts when the locking means is unlatched and the door has been moved to open position;

Fig. 10 is a diagrammatic layout of the major mechanical components of the system of Fig. 9 together with electrical and pneumatic connections used therewith, this figure illustrating one method of electrically controlling the system;

Fig. 11 is a diagrammatic layout similar to Fig. 10 but showing some modified parts and a different method of electrically controlling the system; and Fig. 12 is a view on an enlarged scale, with parts in section, of a modified electromagnet used in the system of Fig. 11.

Referring now more in detail to the drawings, and having reference first to Figs. 1 to 4 thereof, my invention comprises in its more generic aspects a door control system for vehicles operable by the joint action of the vehicle operator and a passenger, comprising a movably mounted door (or doors) D, a locking means L for the door, a control mechanism C under control of the vehicle operator for unlatching and relatching the locking means L, unlatching of the locking means (as depicted in Figs. 1 and 4) serving to free the door for its movement from a closed position (as depicted in Figs. 1, 3 and 4) to an open position (as depicted in Fig. 2) by a passenger exerting a force (such as by pushing) on the door, motive means M connected to the door and operative when the door is opened for returning the door from its opened to a closed position, a holding means H for holding the door open against the return action of said motive means, said holding means having a part $h$–1 under the control of the operator and a part $h$–2 connected to the door and rendered effective for its holding action by the conjoint operation of said parts (*h*–1 and *h*–2) the part *h*–1 under the control of the vehicle operator being operable in itself for releasing the holding means to permit the motive means M to become operative to close the door.

The door (or doors) D and its associated apparatus, best shown in Fig. 3, comprises a pair of swinging doors 20 and 22 rigidly secured as by the plates 24 and 26 to vertical rock shafts 28 and 30, the latter being rotatable in bearings 32 and 34 secured to a mounting plate 36 extending horizontally across the upper portion of the passageway that is normally closed by the swinging doors 20 and 22. The doors 20 and 22 are connected to swing in unison and by means (similar to that disclosed in the Wood patent, 2,598,958) which will permit both of the doors to be swung upon either door being pushed by the passenger. The means for effecting this swinging of the doors in unison comprises a linkage connecting the rock shafts 28 and 30 which includes a rocker bar 38 centrally pivoted upon a vertically disposed mounting post 40 attached to the mounting plate 36, the rocker bar being provided with a central hub 42 oscillatable on a pivot rod 44 extending from the mounting post 40. The linkage further includes a pair of levers 46 and 48 having sockets 50 and 52 respectively fixed to the upper ends of the rocker shafts 28 and 30, the said levers being pivotally connected at their free ends to adjustable links or connecting rods 54 and 56, respectively, the said connecting rods or links being provided, respectively, with socket ends 58 and 60, in turn pivotally connected to the free ends of the rocker bar 38. By means of this linkage it will be apparent that the swinging of either door 20 or 22 to an open position will cause a corresponding and simultaneous swinging in unison of the other door of the pair.

The locking mechanism L (similar to that disclosed in the Wood patent, 2,598,958) includes two engageable sector plates 62 and 64. The sector plate 62 is connected to or integral with the hub 42 of the rocker bar 38, and is seated for rotation on the mounting post 40; thereby the sector plate 62 is connected (through the described linkage) to the doors D. The locking sector plate 64 is pivotally mounted on a supporting post 66, and is provided with a lever arm 68 connected to the control mechanism C in a manner to be presently described.

The control mechanism C under the control of the vehicle operator comprises an electromagnet circuit which includes an electromagnet 70, the core of which has an extension 72 connected to a lever 74 pivotally mounted on the electromagnet housing, the said lever being pivotally connected to a link 76 in turn pivotally connected to the arm 68 of the locking sector plate 64.

The operative relation between the locking means L and the control mechanism C, and the detailed structure of the parts thereof, as well as the sequence of operation of the same under certain operating conditions, are best shown in Figs. 5 to 7 of the drawings. The electromagnet 70 has a coil 78 and a movable core 80 which is provided with the aforesaid core extension 72. The linkage connecting the core extension 72 with the sector plate 64 is normally biased by a spring 82 to the position shown in Fig. 7 of the drawings. Energization of the electromagnet coil causes inward movement of the core 80 against the action of the spring 82 to move the linkage parts to the position shown in Fig. 5, an intermediate position under certain conditions of operation being illustrated in Fig. 6.

The locking sector plate 62 (connected as aforesaid to the doors D) is connected to the motive means M which is operative when the door D is opened for returning the door from its opened to a closed position. The motive means M comprises a spring activated member adapted to be energized when the door is opened for returning the door to closed position and comprises for this purpose more specifically a cylinder 84 pivotally mounted, as at 86, on the mounting plate 36, a piston 88 in the cylinder connected to a piston rod 90 extending from the cylinder 84 and having a socket end 92 pivotally connected to the locking sector plate 62, as best shown in Figs. 1 and 2 of the drawings. Active on the piston 88 is a compression spring 94 adapted to be energized or loaded when the piston 88 is moved from the position shown in Fig. 1 to that shown in Fig. 2 (the latter being the door-opened position of the parts) the energized spring then functioning (when free so to do) for returning the parts to the position shown in Fig. 1 and thereby returning the door to closed position.

With the parts thus far described the system may be operated as follows. The control mechanism C is controlled by the vehicle operator by means of a circuit including a source of energy (battery) 96, conductor 98, switch 100, contact 102, conductor 104 connected to the coil of the electromagnet 70, and conductor 106. The switch 100 is normally closed on the contact 102, and thereby the electromagnet 70 is normally energized to move the locking sector plate 64 to the position shown in Fig. 5. The mating locking sector plate 62, when the doors are closed, is in the position as shown in Fig. 5, and hence under these normal conditions the doors are locked by the locking mechanism L. When the vehicle operator moves the switch 100 to open at the contact 102 the electromagnet 70 is de-energized with the result that the parts operated thereby are moved to the position shown in Fig. 7. The doors are now unlocked (as best depicted in Figs. 1 and 3) and the doors are now free to be pushed open by the passenger. When the doors are pushed open the locking sector plate 62 and the associated parts of the motor M are moved from the Fig. 1 to the Fig. 2 position, the relation between the locking means L and the control mechanism C then existing being best shown in Fig. 7 of the drawings. Without the provision of the holding means which is now to be described, and with the passenger alighting from the vehicle and releasing his hold on the door, the now spring energized or loaded motor M causes the return of the parts to door-closed condition.

The holding means H is provided for holding the door open against the return action of the motive means M until such holding means is released by the vehicle operator. This holding means H is constructed so that for its holding action it is under the conjoint control and operation of the vehicle operator and the passenger in the latter's action to push the door to opened condition, the releasing of the holding action, however, being solely under the control of the vehicle operator. More specifically, the holding means H is rendered effective for its holding action by the conjoint operation of a part such as *h*–1 under the control of the operator and a part such as *h*–2 connected to the door. In the embodiment shown in Figs. 1 to 7 the holding means is directly associated with the motive means M and comprises a pneumatic means connected to the motor cylinder 84 for action on the piston 88 thereof acting against the return action of the energized spring 94, said pneumatic means being connected to and controlled by an electromagnet circuit associated with the said controlling parts *h*–1 and *h*–2 referred to.

The pneumatic means comprises a valve device 108 operated by an electromagnet 110 having ingress port 112, egress port 114 and an atmosphere exhaust port 116, said valve being connected at its ingress end by means of the pipe 118 to a pressure supply 120 and being connected at its egress end by means of the pipe 122 to the interior of the cylinder 84. The electromagnet-valve device is shown in detail in Fig. 8; it includes a magnet core 124 to which is connected the valve stem 125 having the valve parts at its opposed ends as shown in Fig. 8 operating as follows:

When the magnet 110 is de-energized (its normal state) the flow pressure fluid from the cylinder 120 is checked at the valve and the cylinder 84 is open to atmospheric exhaust (at the upper end of the valve); when the electromagnet 110 is energized the valve stem 125 will be moved to close the cylinder 84 to exhaust and to open the same for the flow of pressure fluid from the supply cylinder 120.

The electromagnet 110 is energized by the conjoint operation of the parts h–1 and h–2. The part h–2 comprises a cam extension 124' of the lever 46 adapted to close the contacts (normally open) of a micro-switch 126 when the doors are moved by the passenger to partly open position. The contacts of the microswitch 126 are arranged in a circuit controlled by the operator's switch 100, said circuit comprising the energy source 96, conductor 98, switch 100, contact 128, conductor 130, microswitch 126 and conductor 132 to the electromagnet 110 (the opposite ends of the circuit being grounded).

With this arrangement, when the vehicle operator moves the switch 100 to close the contact 128 (the movement of the switch opening the contact at 102, causing the unlatching of the locking mechanism L) and when the passenger has pushed the door partly open sufficient to cause the closing of the contacts of the micro-switch 126, the electromagnet-valve will be operated to cause fluid pressure to flow into the cylinder 84 and to move the piston 88 to a position for full door opening and to hold this piston against spring action to maintain the doors open. The electromagnet-valve is then placed solely under the control of the vehicle operator for releasing the holding means to permit the doors to close; the operator by opening the switch contact 128 will cause the de-energization of the magnet 110 with the result that the holding means H is released permitting the doors to move to closed position. The operator, in moving the switch 100 to close the contact 102, will thereupon complete the relatching of the locking means L.

A modification of the system is shown in Figs. 9 and 10 of the drawings wherein parts similar to the system of Figs. 1 to 8 are indicated by similar, but primed, reference characters. The holding means H' in this form of the invention comprises a switch 100' under the operators' control for operating a circuit controlling an electromagnet 71 (similar to the electromagnet 70) which, by means of the linkage 134, operates a latch 136, and a member 138 co-actable with said latch 136, to effect the holding action, the said member 138 being formed as an arm extension of the locking sector plate 62'. With this arrangement and with the control circuits shown in Fig. 10, the vehicle operator in moving the switch 100' (to unlatch the locking means L') closes a switch contact 140, and the passenger in pushing the door to its substantially open position, as shown in Fig. 9, moves the sector plate 62' to a position where a cam part 142 engages a microswitch 144 for closing the contacts thereof, as shown in Figs. 9 and 10. With the closing of the contact 140 and the contacts of the microswitch 144 the following circuit is closed to energize the magnet 71, namely, battery 96', conductor 98', switch 100', contact 140, conductor 146, microswitch contacts 144 and conductor 148 to the magnet 71; the holding means H' with the parts as shown in Figs. 9 and 10 will then hold the door in its opened condition. When the operator thereafter moves his switch to close the circuit for relatching the locking means L', this described circuit will be opened at the contact 140, thereby causing the de-energization of the magnet 71, and the movement of the latch 136 to a position to permit the motor M' to return the door to closed condition.

In Figs. 11 and 12 I show a different circuit arrangement for operating the door control means of Fig. 9; and in these figures parts similar to those in Figs. 9 and 10 will be designated by similar reference characters with the exponent 2. In this circuit arrangement, in lieu of the electromagnet 71 I employ an electromagnet 150, shown in detail in Fig. 12, designed so that when energized the arm 152 pivoted at 154 and connected to the core stem 156 will be moved from the normal position shown in the figures outwardly to an unlatching position. The core stem 156 is attached to the movable core 158 acted upon by the spring 160; when the magnet is energized the core 158 will be moved inwardly against the action of the spring 160. With this arrangement when the switch $100^2$ is closed (normally) on its contact $102^2$ the magnet 150 is energized to move the holding latch $136^2$ to unlatched condition by means of the circuit including the battery $96^2$, conductor $98^2$, switch $100^2$, conductor $104^2$ and conductor 162 to the magnet. When this circuit is opened (as when the circuit is opened to unlatch the locking means $L^2$) the electromagnet 150 will be de-energized whereby the latch $136^2$ is moved to its latching position.

In all of these three modifications the holding means is rendered effective for its holding action by the conjoint operation of parts, one set of parts being under control of the operator and the other set of parts being connected to the door so that it is under control of the passenger, the parts under the control of the vehicle operator being, themselves, operable for releasing the holding means to permit the motive means to become operative to close the door.

The system in all its described modifications also incorporates in the locking mechanism the arrangement (see Figs. 5 to 7) including a roller 163 secured to the sector 62 cooperating with the surface 164 and depression 166 of the sector 64, the cooperation of which parts is as follows: should a passenger be leaning against the door when the locking means L is unlatched, the parts will move only from the Fig. 5 to the Fig. 6 position, the roller 163 then becoming engaged by the depression 166, and the door will be prevented from being opened; however, as soon as the passenger removes his leaning weight from the door or when no leaning on the door takes place, the sector 62 moves to the Fig. 7 position and the door is free to be pushed open.

The system also incorporates mechanism for applying the brakes of the vehicle and, if desired, signaling means for indicating what is occurring. In Fig. 4, this is done by an electromagnet circuit 168 operating valve 170 (similar to valve 108) for opening the pressure supply 120 to the brake operating cylinder 172 when the sector plate is moved to unlatching position (Fig. 4), the cam surface 164 thereof thereupon closing the contacts of a microswitch 174 controlling said circuit. At the same time this circuit flashes the signal light 176. This is also shown in the systems of Figs. 10 and 11 where similar parts are indicated by similar but indexed reference characters.

The use and operation of the push-door control system of my present invention and the many advantages secured thereby will, in the main, be fully apparent from the above detailed description thereof. It will be further apparent that many changes may be made in the structure thereof without departing from the principles of the invention defined in the following claims.

I claim:

1. A door control system for vehicles operable by the joint action of the vehicle operator and a passenger, comprising a movably mounted door, locking means for the door, mechanism under control of the vehicle operator for unlatching and relatching the locking means, unlatching of the locking means serving to free the door for its movement from a closed to an open position by a passenger exerting a force on the door, motive means connected to the door and operative when the door is opened for returning the door from its opened to a closed position, holding means for holding the door open against the return action of said motive means, said holding means having a part under the control of the operator and a part connected to said door and including means connecting said parts for rendering effective the holding action by said holding means by the conjoint operation of said parts, the part under control of the vehicle operator being operable for releasing the holding means to permit the motive means to become operative to close the door.

2. The push-door control system of claim 1 in which the said motive means comprises a spring activated member adapted to be energized when the door is opened for returning the door to closed position, and in which the said holding means includes a pneumatic means connected to be active on said member against the energized return action thereof.

3. The push-door control system of claim 1 in which the said motive means comprises a cylinder, a piston therein, a piston rod connected to the door, and a spring active on the piston and adapted to be energized when the door is opened for returning the door to closed position, and in which said holding means includes a pneumatic means connected to said cylinder for action on said piston against the return action of said spring.

4. The push-door control system of claim 1 in which the said motive means comprises a spring activated member adapted to be energized when the door is opened for returning the door to closed position, and in which the part of the holding means under control of the operator includes an electromagnetically operated latch and the part of the holding means connected to the door includes a member coactable with said latch to effect the holding action.

5. The push-door control system of claim 1 in which said holding means for holding the door open includes mechanism active on said motive means when the door is only partly opened by the passenger for automatically opening the door to its fully opened position.

6. The push-door control system of claim 1 in which the said motive means comprises a spring-activated member adapted to be energized when the door is opened for returning the door to closed position, and in which the said holding means includes a pneumatic means connected to be active on said member against the energized return action thereof and mechanism for operating said pneumatic means whereby said member is acted upon when the door is only partly opened for automatically acting on said member for opening the door to its fully opened position.

7. A push-door control system for vehicles comprising a hingedly mounted door, locking means for the door, mechanism under control of the vehicle operator for unlatching and relatching the locking means, unlatching of the locking means serving to free the door for its hinged movement from a closed to an open position by a passenger pushing the door, motive means connected to the door and operative when the door is opened for returning the door from its opened to a closed position, holding means for holding the door open against the return action of said motive means, said holding means having a part under the control of the operator and a part connected to said door and including means connecting said parts for rendering effective the holding action by said holding means by the conjoint operation of said parts, the part under control of the vehicle operator being itself operable for releasing the holding means to permit the motive means to become operative to close the door.

8. A door control system for vehicles operable by the joint action of an operator and a passenger, comprising a movably mounted door, locking means for the door, mechanism under control of the vehicle operator for unlatching and relatching the locking means, unlatching of the locking means serving to free the door for its movement from a closed to an open position by a passenger exerting a force on the door, motive means connected to the door and operative when the door is opened for returning the door from its opened to a closed position, holding means for holding the door open against the return action of said motive means, said holding means having a part under the control of the operator and a part connected to said door and including means connecting said parts for rendering effective the holding action by said holding means by the conjoint operation of said parts, the part under control of the vehicle operator being itself operable for releasing the holding means to permit the motive means to become operative to close the door, said last mentioned part being associated with the operator control mechanism whereby relatching of the locking means and release of the holding means are simultaneously effected.

9. A push-door control system for vehicles comprising a hingedly mounted door, locking means for the door, mechanism under control of the vehicle operator including an electromagnet circuit controlled by an operator switch for unlatching and relatching the locking means, unlatching of the locking means serving to free the door for its hinged movement from a closed to an open position by a passenger pushing the door, motive means connected to the door and energized when the door is opened for returning the door from its opened to a closed position, holding means for holding the door open against the energized action of said motive means, said holding means having a part under the control of the operator and a part connected to said door and including means connecting said parts for rendering effective the holding action by said holding means by the conjoint operation of said parts, the part under control of the vehicle operator comprising an electromagnet circuit controlled by an operator switch and itself operable for releasing the holding means to permit the motive means to become operative to close the door.

10. The push-door control system of claim 9 in which both electromagnet circuits are connected at the operator's switch whereby relatching of the locking means and release of the holding means are simultaneously effected.

11. The push-door control system of claim 9 in which the said motive means comprises a cylinder, a piston therein, a piston rod connected to the door, and a spring active on the piston and adapted to be energized when the door is opened for returning the door to closed position, and in which said holding means includes a pneumatic means connected to said cylinder for action on said piston against the return action of said spring, said pneumatic means being connected to and controlled by the second mentioned electromagnet circuit.

12. The push-door control system of claim 9 in which the said motive means comprises a spring activated member adapted to be energized when the door is opened for returning the door to closed position and in which the holding means includes a latch operated by the second mentioned electromagnet circuit, and the part of the holding means connected to the door includes a member coactable with said latch to effect the holding action.

References Cited in the file of this patent

UNITED STATES PATENTS

| | | |
|---|---|---|
| 1,963,430 | Zarafu | June 19, 1934 |
| 2,259,479 | Newkirk | Oct. 21, 1941 |
| 2,419,964 | Newkirk | May 6, 1947 |
| 2,598,958 | Wood | June 3, 1952 |